(12) United States Patent
Mazzullo et al.

(10) Patent No.: US 9,071,002 B2
(45) Date of Patent: Jun. 30, 2015

(54) POWER SUPPLY UNIT

(71) Applicant: Power Logic South Africa (Pty) Ltd, Ottery (ZA)

(72) Inventors: Raymond Mazzullo, Constantia (ZA); Adrian Mazzullo, Noordehoek (ZA); Brian Van Zyl, Ottery (ZA); Bastian Strauf, Strand (ZA)

( * ) Notice: Subject to any disclaimer, the term of this patent is extended or adjusted under 35 U.S.C. 154(b) by 80 days.

(21) Appl. No.: 13/903,142

(22) Filed: May 28, 2013

(65) Prior Publication Data
US 2013/0316570 A1 Nov. 28, 2013

(30) Foreign Application Priority Data

May 28, 2012 (ZA) .................................. 2012/03878
Jun. 27, 2012 (ZA) .................................. 2012/04782

(51) Int. Cl.
| | |
|---|---|
| *H02G 3/14* | (2006.01) |
| *H01R 13/516* | (2006.01) |
| *H01R 13/518* | (2006.01) |
| *H02G 3/12* | (2006.01) |
| *H01R 13/447* | (2006.01) |
| *H01R 25/00* | (2006.01) |
| *H02G 3/18* | (2006.01) |

(52) U.S. Cl.
CPC ............ *H01R 13/516* (2013.01); *H01R 13/447* (2013.01); *H01R 13/518* (2013.01); *H01R 25/006* (2013.01); *H02G 3/121* (2013.01); *H02G 3/128* (2013.01); *H02G 3/185* (2013.01)

(58) Field of Classification Search
USPC ............ 439/535, 954, 652, 136, 142; 174/67, 174/66
See application file for complete search history.

(56) References Cited

U.S. PATENT DOCUMENTS

| | | | | |
|---|---|---|---|---|
| 3,813,640 | A * | 5/1974 | Carissimi ...................... | 439/655 |
| 5,023,396 | A * | 6/1991 | Bartee et al. .................. | 174/486 |
| 5,122,069 | A * | 6/1992 | Brownlie et al. ............. | 439/131 |
| 5,899,761 | A * | 5/1999 | Crane et al. ................... | 439/142 |
| 6,290,518 | B1* | 9/2001 | Byrne ........................... | 439/131 |
| D463,775 | S * | 10/2002 | Byrne ....................... | D13/139.4 |
| 6,492,591 | B1* | 12/2002 | Metcalf .......................... | 174/53 |
| 6,875,051 | B2* | 4/2005 | Pizak ............................. | 439/535 |
| 8,410,363 | B1* | 4/2013 | Baldwin et al. ................ | 174/67 |
| 2005/0183873 | A1* | 8/2005 | Gottardo et al. ................ | 174/50 |

\* cited by examiner

*Primary Examiner* — Phuong Dinh
(74) *Attorney, Agent, or Firm* — Jennifer L. Bales; Macheledt Bales LLP (57) ABSTRACT

Multi-outlet socket boxes for providing power and, optionally, data connection. The sockets are mounted in oppositely directed inclined flanks of a socket support structure. The socket includes a casing containing the support structure, with an opening in the casing and a cover which, in its closed position conceals the structure and in its open position permits access to the sockets. The cover may be in two parts which move towards and away from one another during closing and opening movements. The cover could include several slats hinged together, guides for guiding the slats, and a locking mechanism.

7 Claims, 9 Drawing Sheets

POWER SUPPLY UNIT

FIELD OF THE INVENTION

THIS INVENTION relates to multi-outlet socket boxes for providing power and, optionally, data connection.

BACKGROUND TO THE INVENTION

Multi-outlet socket boxes for providing power and data connections are widely used. The box can be pressed into a hole in a working surface, into a recess in a floor or into a recess in a wall.

The present invention provides an improved socket box with multiple outlets which is primarily intended for mounting in a hole in a working surface but which could if desired be wall or floor mounted.

BRIEF DESCRIPTION OF THE INVENTION

According to the present invention there is provided a socket box with multiple sockets, the sockets being mounted in the oppositely directed inclined flanks of a socket support structure.

The socket box can comprise a casing containing said support structure, there being an opening in said casing and a cover which, in its closed position conceals said structure and in its open position permits access to be had to said sockets.

Said cover can be in two parts with a split line between them, the parts moving towards and away from one another during closing and opening movements.

Said cover can comprise a plurality of slats which are hinged together, said casing including guides for guiding the slats during opening and closing movements of the cover.

Said structure can be mounted for movement within the casing from a retracted inoperative position in which it is concealed by the closed cover and an extended operative position in which it protrudes from the casing through said opening.

In the preferred form the socket box includes releasable locking means for locking the support structure in its retracted position and a manually releasable latch structure for preventing the support structure being displaced from its operative position to its inoperative position until the latching means is manually released.

The locking means can be of the "press to engage/press to release" type. In a specific constructional form the latch structure includes a spring for urging a latching element of the structure into engagement with a fixed part of the socket box. The socket box can also include an upwardly protruding element for displacing said latching element out of engagement with said fixed part to permit the support structure to be moved to its retracted position.

BRIEF DESCRIPTION OF THE DRAWINGS

For a better understanding of the present invention, and to show how the same may be carried into effect, reference will now be made, by way of example, to the accompanying drawings in which.

DETAILED DESCRIPTION OF THE DRAWINGS

Figure 1:
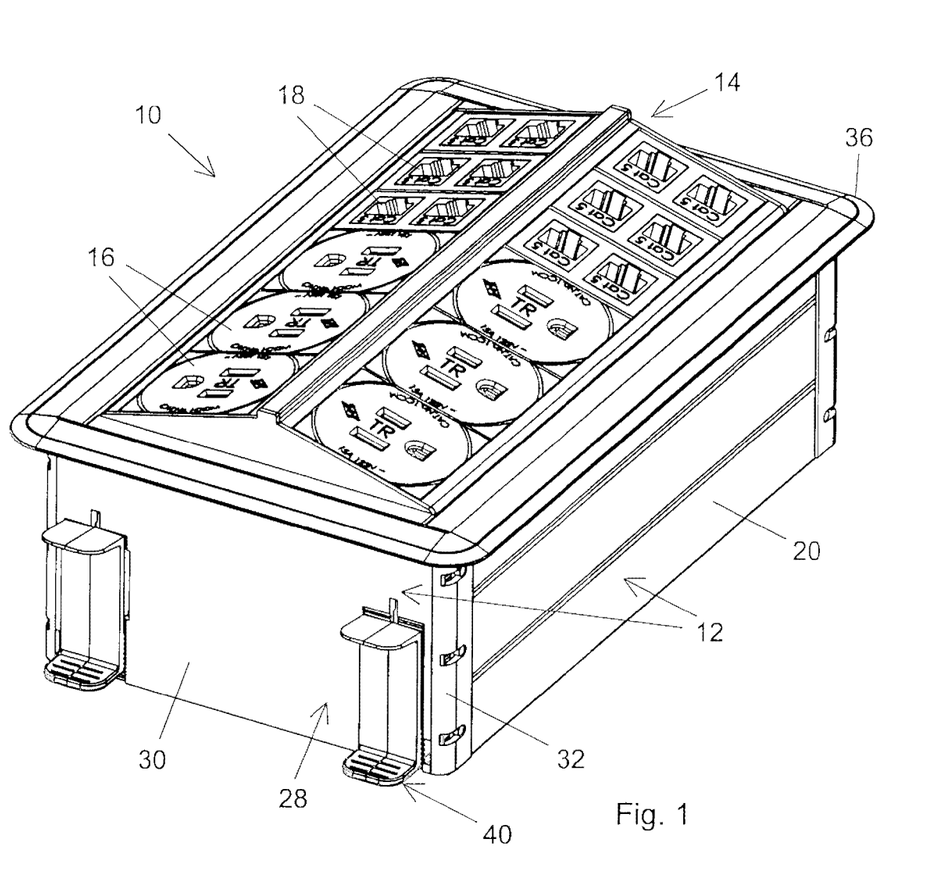
FIG. 1 is pictorial view of a socket box in its open, operative condition.
Figure 2:
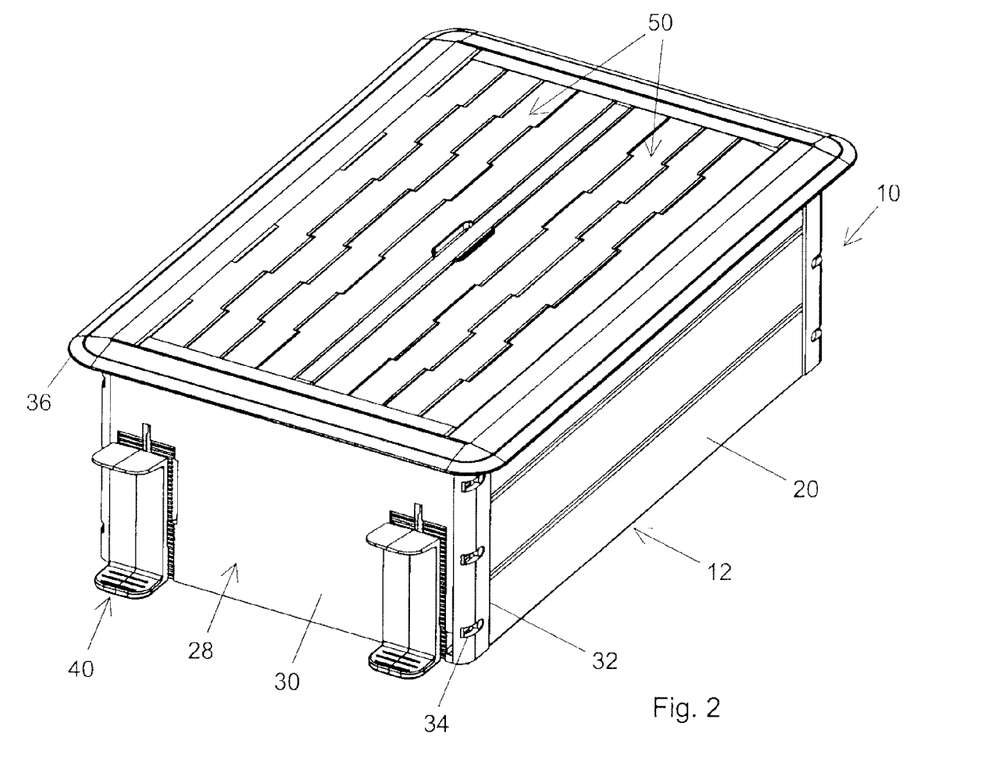
FIG. 2 is a pictorial view of the socket box in a fully closed condition.
Figure 3:
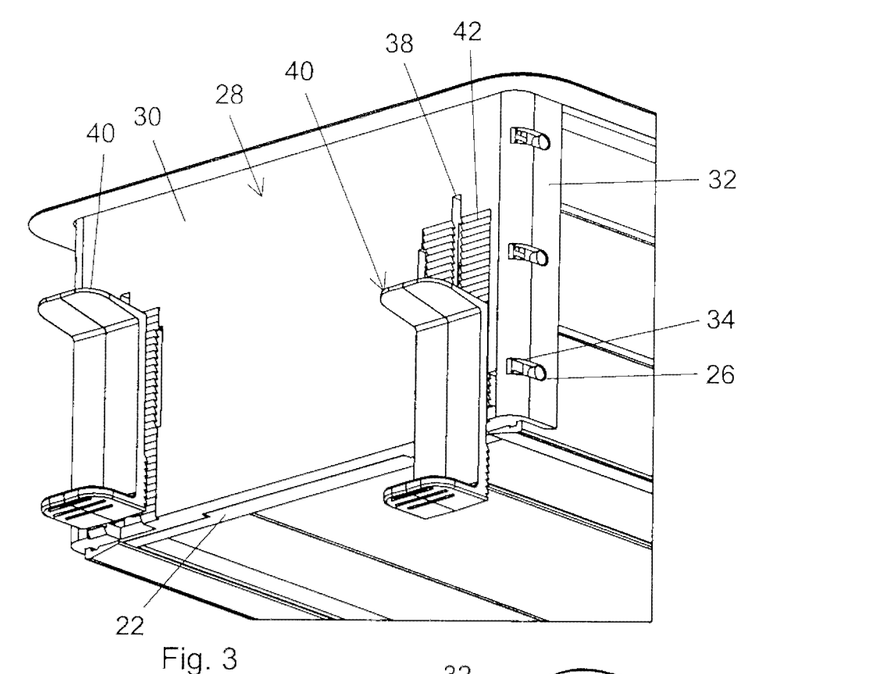
FIGS. 3 and 4 are pictorial views from below of one end of the socket box.
Figure 4:
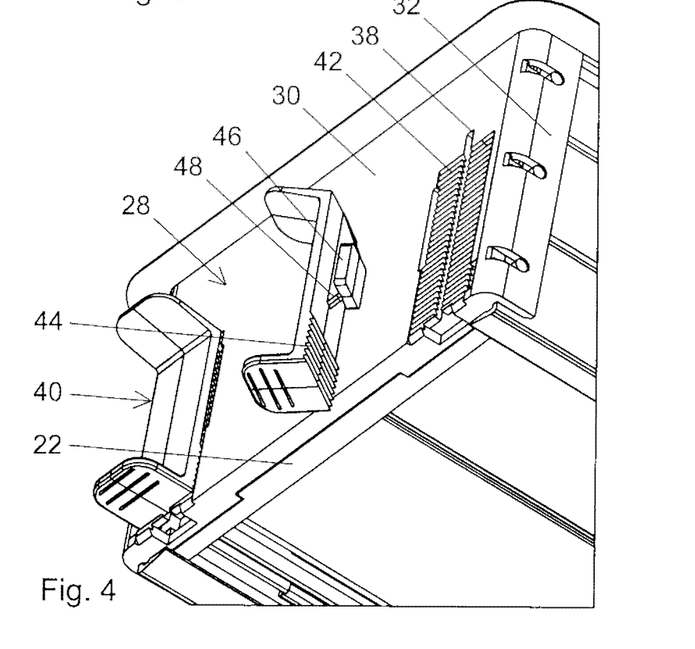

The socket box 10 illustrated in FIGS. 1 and 2 comprises a casing 12 and a support structure 14 for power sockets 16 and data sockets 18.

The support structure 14 comprises two mounting plates which are both inclined and which together form a pyramid with an included angle of about 135 degrees at its apex. The sockets 16 and 18 are secured in holes formed in the two sloping flanks thus provided. This enables easy access to data and power sockets by users located at opposed edges of the working surface into a hole in which the casing 12 has been sunk.

Figure 5:
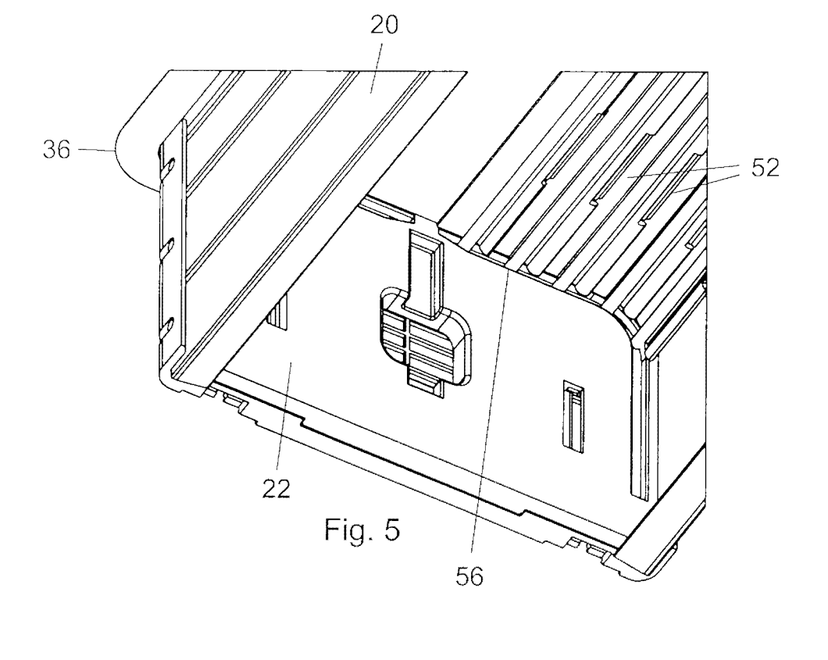
FIGS. 5 and 6 are pictorial views looking into the part assembled box from below, the Figures illustrating the movement of the cover of the socket box.
Figure 6:
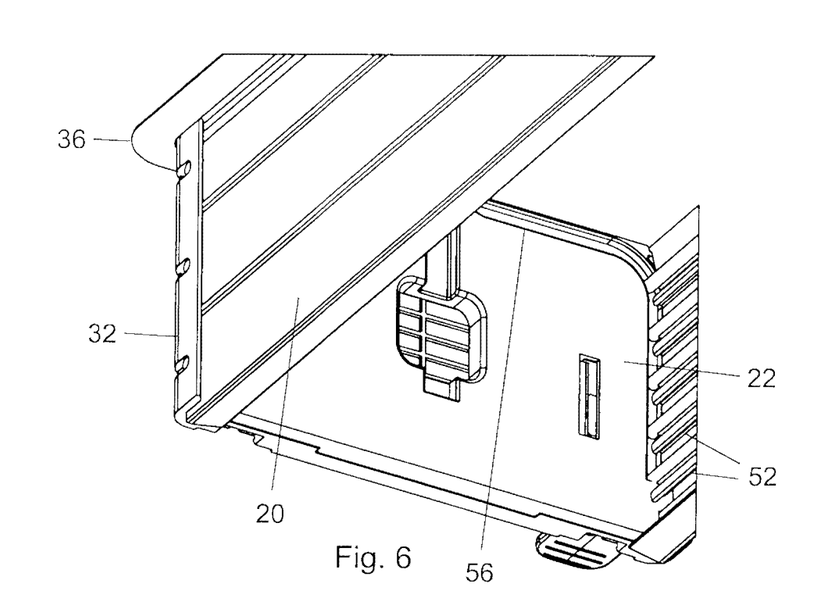

The casing 12 comprises two side extrusions 20 and two transverse plates 22. The extrusions 20 are drilled at each end to form through bores (not shown). The plates 22 are injection moulded and have laterally protruding pins 26 which pass through the bores in the extrusions 20. It is the inside surface of the plate 22 which is illustrated in FIGS. 5 and 6 that is visible in those Figures.

Reference numeral 28 designated a bracing plate which is injection moulded and has a web 30 and two side flanges 32 which are at right angles to the web 30. The flanges 32 have horizontal slots 34 in them which, as the plates 28 are pressed onto the end of the partly assembled socket box, receive the parts of the pins 26 which protrude from the bores in the extrusions 20.

A decorative frame 36 fits onto the extrusions 20 and plates 22 and 28 to hold the casing components together.

The web 30 has two laterally spaced vertical slots 38 which permit clamps designated 40 to be moved vertically along them. The frame 36 rests on the top of the work surface and the clamps 40 are slid up so that the lop flange of each clamp 40 is against the underside of the work surface so as firmly to locate the socket box in the hole in the work surface. The web 30 has ratchet teeth 42 and the clamp 40 has corresponding ratchet teeth 44, The clamp 40 further comprises a block 46 which is on the inside of the web 30 with a web 48 of the clamp 40 passing through the slot 38.

Figure 7:
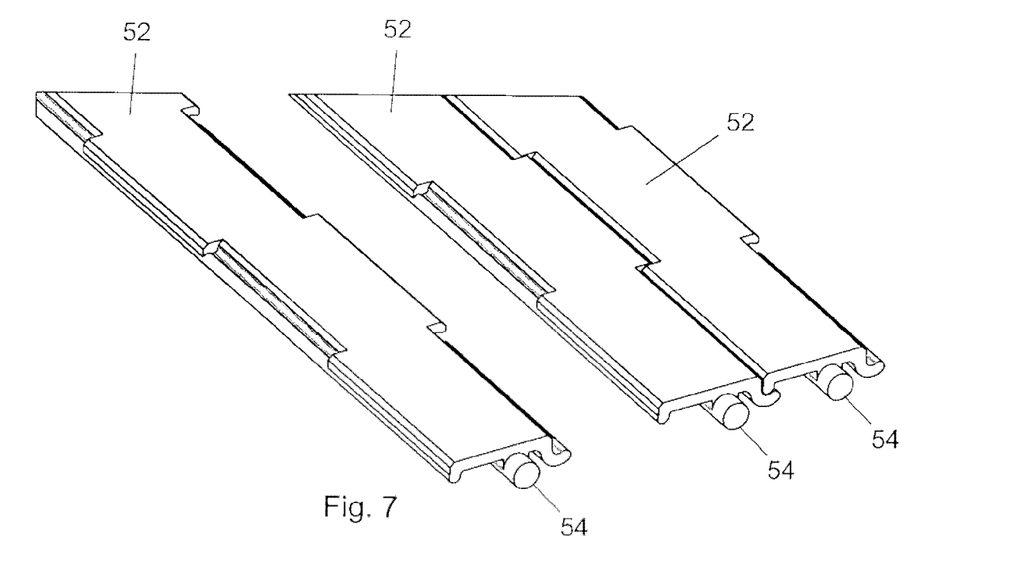
FIG. 7 is a pictorial view of three slats of the cover.
Figure 8:
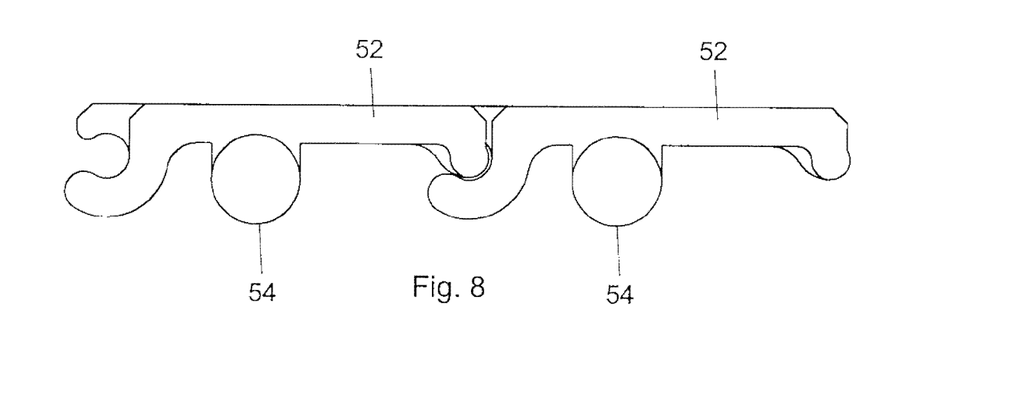
FIG. 8 is a side elevation of two slats of the cover.

The cover of the socket box is designated 50 and comprises a plurality of slats 52 which are hinged together as shown in FIGS. 7 and 8 so that they can pivot with respect to one another. A rod 54 is secured to each slat 52 and protrudes beyond the respective slat in both directions.

The inside surfaces or the plates 22 are formed with guide channels 56 (FIGS. 5 and 6) which receive the ends of the rods 54.

The cover 50 is in two parts which move towards and away from one another during closing and opening movements. In FIG. 2 the parts are each shown in their fully closed position. It will be understood that the cover parts are guided so that, in the open condition, they lie adjacent the inner faces of the extrusions 20 as shown in FIG. 6.

In each of FIGS. 5 and 6 part of the left hand side extrusion 20 is shown and the far one of the transverse plates 22. In FIG. 5 it is the underside of one half of the closed cover that can be seen. The other half of the cover has been omitted from FIG. 5. In FIG. 6 the same half of the cover is shown in its open position adjacent the inner face of the right hand side extrusion 20.

The support structure 14 is free to move vertically from a position in which its apex is below the level of the cover 50, as shown in FIG. 2, to the raised position illustrated in FIG. 1. The mechanism for raising and lowering the structure 14 can be as described below with reference to FIGS. 7 to 13.

In an alternative embodiment the structure 14 does not move vertically. It is fixed and its apex at all times remains below the level of the cover 50.

Turning now to FIGS. 9 to 13, reference numeral 60 designates the extrusion which constitutes the vertically movable part of the socket box. The extrusion 60 comprises two spaced vertical side walls 62, a vertical centre partition 64 and a base wall 66. The base wall 66 has a downwardly open T-shaped slot 68 in it which is attached to a locking mechanism as will be described.

The upper end of the partition 64 is bifurcated to provide a cavity into which a centre strip 70 is inserted. Transverse end panels 72 close-off the ends of the cavity which is bounded by the extrusion 60 The screws which connect the panel 72 to the extrusion 60 are designated 74.

The part of the socket box which, in use, is fixed and in which the extrusion 60 moves vertically, comprises two side panels 76 and a base 78 the edges of which are slid into guideways 80 provided along the lower edges of the panels 76. End plates 82, one of which is visible in FIG. 9, close-off the ends of the fixed part of the socket box. The end plate 82 has been omitted from FIG. 10.

Figure 9:
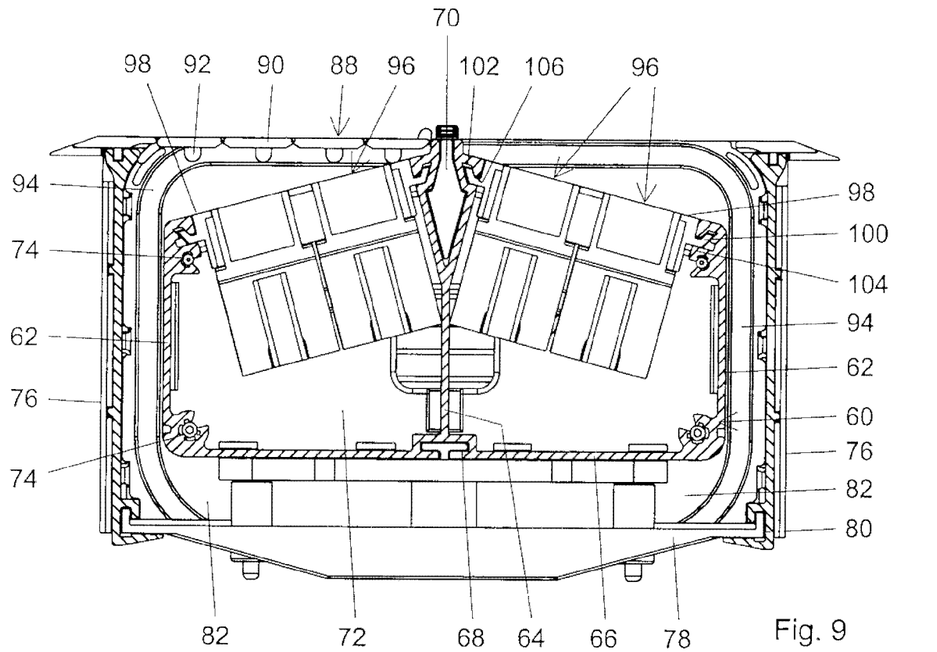
FIG. 9 is a transverse section through a further form of socket box with multiple outlets.

As in the embodiment of FIGS. 1 to 8, the cover of the socket box is in two parts only one of which is shown in FIG. 9 and is designated 88. The part 88 shown comprises a plurality of slats 90 and rods 92 as described above.

Reference numeral 94 designates a groove in the face of the plate 82 in which the ends of the rods 92 move during opening and closing movements.

Data and power sockets are shown at 96 and are carried by two frames 98 which have lips 100 and 102 that slide in guideways 104 and 106 in the upper edges of the side walls 62 and the partition 64.

Mounted on the base 78 (see FIG. 2) are two columns 108. The lower end of each column 108 is in a guide 110 and there are springs (not shown) in the guides for pushing the columns upwardly. In an alternative construction there is a single spring between a platform 112 mounted on the columns 108 and the base 78. The platform 112 has two T-shaped guides 114 which slide into the slot 68 as the base 78 is moved to its position under the vertically movable part of the socket box.

A "press to lock/press to release" type of locking mechanism 116 (FIGS. 12 and 13) is secured to the underside of the platform 112 and co-operates with a male locking spike 118 which is mounted on the base 78.

Figure 10:
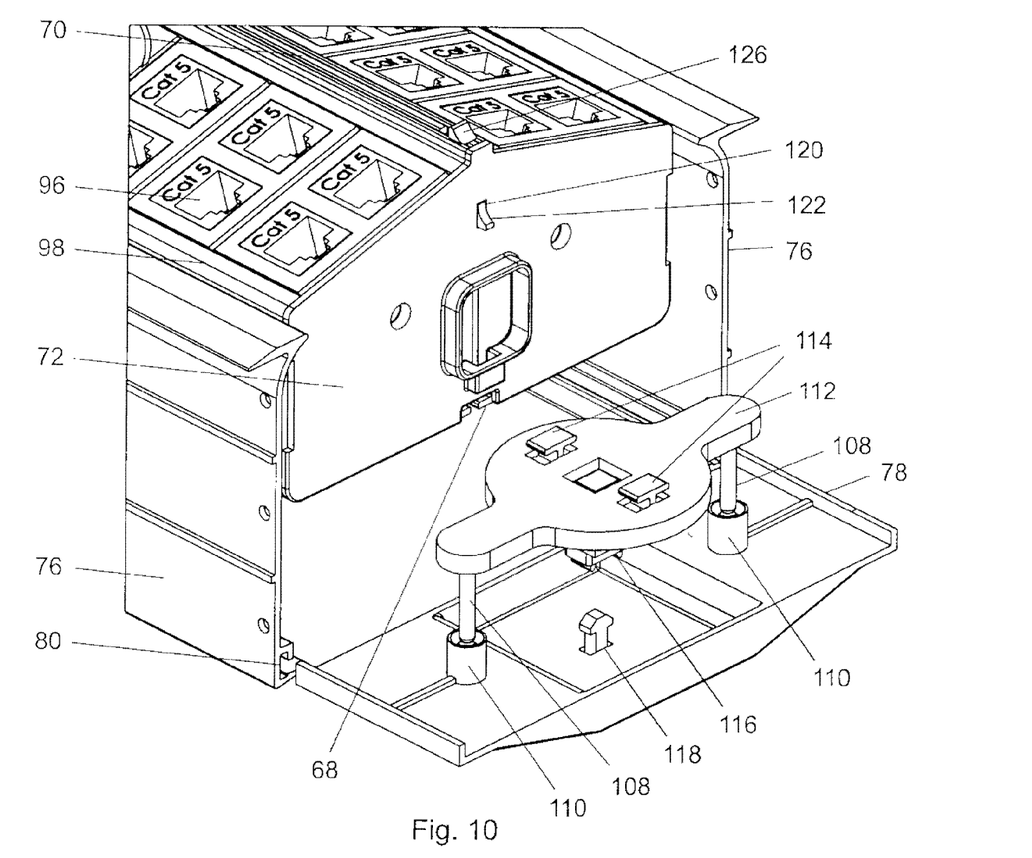
FIG. 10 is a pictorial view of a partly assembled socket box.
Figure 11:
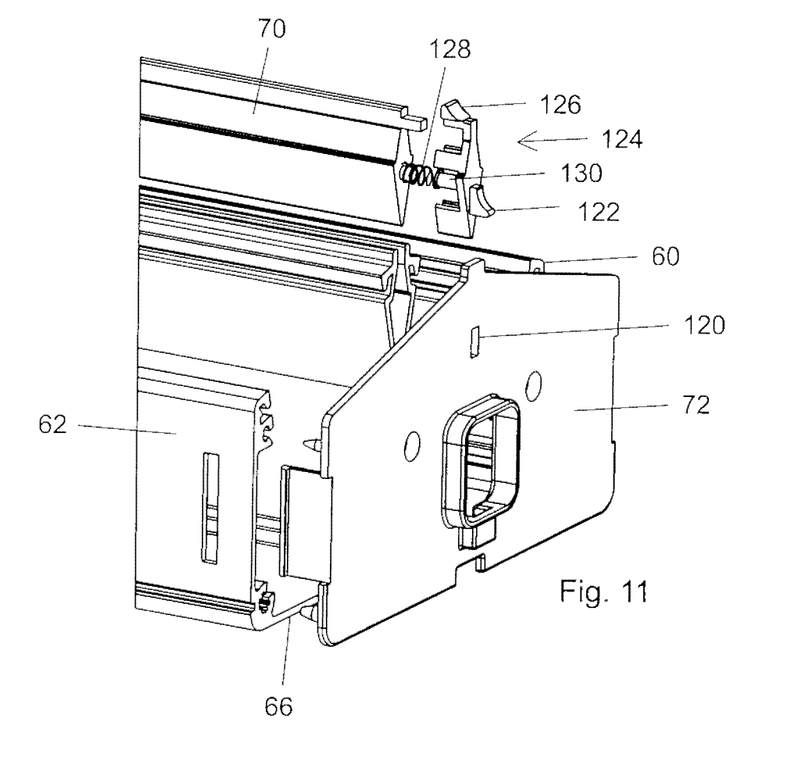
FIG. 11 is an "exploded" view of a socket box.
Figure 12:
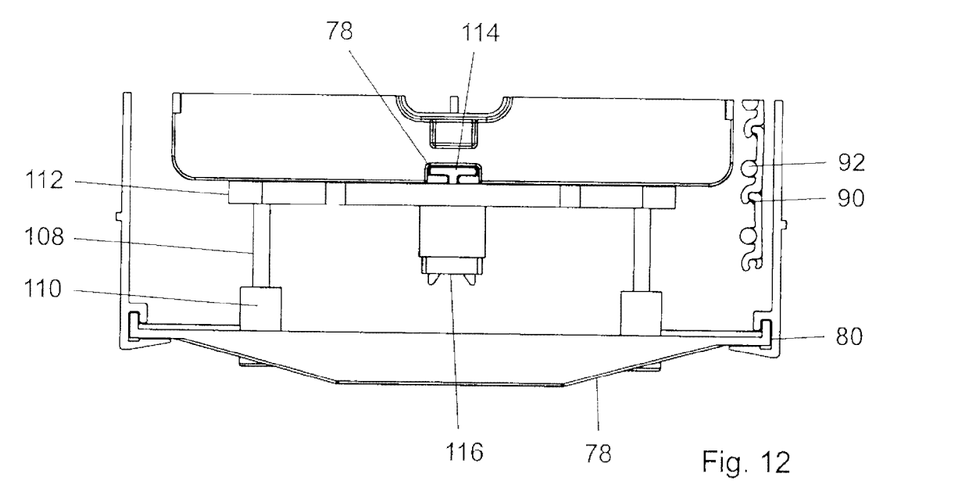
FIG. 12 is an elevation of a locking mechanism.
Figure 13:
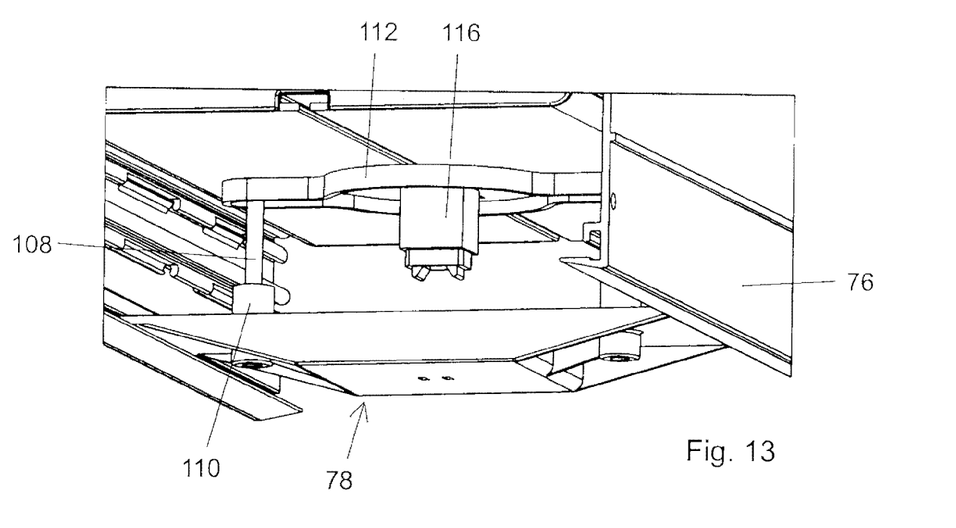
FIG. 13 is a pictorial view of the locking mechanism of FIG. 12.

Each panel 72 has a rectangular hole 120 (FIGS. 10 and 11) therein for receiving the latching element 122 of a latch structure designated 124. Each latch structure 124 includes an upwardly protruding element 126 which, as best seen in FIG. 10, is above the level of the centre strip 70 and is thus readily accessible. A coil spring 128 is positioned between the centre strip 70 and the latch structure 124, a guide pin 130 of the structure 124 being inside the spring 128.

When the movable structure is in the raised position, as shown in FIG. 10, the elements 122 are in the holes 120. If the movable structure is pressed down, the horizontal under surfaces of the latching elements 122 bear on the bottom edges of the holes 120 and prevent any downward movement.

To release the movable part so that it can be moved down to its retracted position, the elements 126 are pushed towards one another so that the latching elements 122 are withdrawn from the holes 120. There is now no resistance to downward movement of the movable part of the socket box.

As the locking mechanism 116 encounters the spike 118, the jaws of the mechanism 116 close onto the spike 118 thus retaining the movable part in its retracted position.

The movable part of the socket box is pressed down to release the locking mechanism 116 and the movable part is then free to rise under the action of the spring or springs. The elements 122 enter the holes 120 to lock the vertically moving part in its elevated position.

The columns 108 and the springs that push them up can be replaced in an alternative embodiment, by gas struts.

The invention claimed is:

1. A socket box with multiple sockets comprising:
a socket support structure having oppositely directed, inclined flanks;
sockets mounted in said oppositely directed, inclined flanks of the socket support structure;
a casing containing said support structure;
an opening in said casing; and
a cover which, in its closed position, conceals said structure and in its open position permits access to said structure, said structure being mounted for movement within the casing from a retracted inoperative position in which it is concealed by the closed cover and an extended operative position in which it protrudes from the casing through said opening.

2. A socket box as claimed in claim 1, wherein said cover is in two parts, the parts moving towards and away from one another during closing and opening movements.

3. A socket box as claimed in claim 1, wherein said cover comprises a plurality of slats which are hinged together, said casing including guides for guiding the slats during opening and closing movements of the cover.

4. A socket box as claimed in claim 1, and including releasable locking means for locking the support structure in its retracted position and a manually releasable latch structure for preventing the support structure being displaced from its operative position to its inoperative position until the latching means is manually released.

5. A socket box as claimed in claim 4 wherein the locking means is of the "press to engage/press to release" type.

6. A socket box as claimed in claim 4 in which the latch structure includes a spring for urging a latching element of the structure into engagement with a fixed part of the socket box.

7. A socket box as claimed in claim 6 and including upwardly protruding element for displacing said latching element out of engagement with said fixed part to permit the support structure to be moved to its retracted position.

* * * * *